(12) United States Patent
Takasu et al.

(10) Patent No.: US 6,562,313 B2
(45) Date of Patent: May 13, 2003

(54) ELECTRODE MATERIAL FOR ELECTROCHEMICAL CAPACITOR, ELECTROCHEMICAL CAPACITOR COMPRISING THE SAME, AND METHOD FOR THE PRODUCTION OF THE SAME

(75) Inventors: Yoshio Takasu, Ueda (JP); Yasushi Murakami, Ueda (JP); Mitsuo Ueno, Ueda (JP); Shigeo Aoyama, Otsu (JP); Mayumi Iwagawa, Osaka (JP); Kiyoshi Sato, Suita (JP); Seiichi Asada, Osaka-fu (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/855,648

(22) Filed: May 16, 2001

(65) Prior Publication Data

US 2001/0038519 A1 Nov. 8, 2001

Related U.S. Application Data

(62) Division of application No. 09/373,079, filed on Aug. 11, 1999, now Pat. No. 6,275,371.

(30) Foreign Application Priority Data

Aug. 12, 1998 (JP) ............................................ 10-228199

(51) Int. Cl.$^7$ .............................................. C01G 23/047
(52) U.S. Cl. ........................ 423/612; 423/615; 501/134; 501/136
(58) Field of Search ................................ 423/609, 610, 423/612, 615; 501/136, 134

(56) References Cited

U.S. PATENT DOCUMENTS

| | | | |
|---|---|---|---|
| 4,787,934 A | | 11/1988 | Johnson et al. |
| 4,859,237 A | | 8/1989 | Johnson et al. |
| 5,215,943 A | * | 6/1993 | Anderson et al. .............. 501/12 |
| 5,227,342 A | * | 7/1993 | Anderson et al. .............. 501/12 |
| 6,224,884 B1 | * | 5/2001 | Remy ........................ 424/401 |

* cited by examiner

*Primary Examiner*—Ngoclan Mai
(74) *Attorney, Agent, or Firm*—Birch, Stewart, Kolasch & Birch, LLP

(57) ABSTRACT

An electrode material for an electrochemical capacitor having a large capacity, having a titanium oxide compound such as titanium oxide, hydrated titanium oxide or their hydrogenated products, and at least one oxidizable and reducible metal element contained in the titanium oxide compound.

7 Claims, 8 Drawing Sheets

ELECTRODE MATERIAL FOR ELECTROCHEMICAL CAPACITOR, ELECTROCHEMICAL CAPACITOR COMPRISING THE SAME, AND METHOD FOR THE PRODUCTION OF THE SAME

This application is a divisional of co-pending application Ser. No. 09/373,079, filed on Aug. 11, 1999, now U.S. Pat. No. 6,275,371 the entire contents of which are hereby incorporated by reference and for which priority is claimed under 35 U.S.C. §120; and this application claims priority of application No. 10-228199 filed in Japan on Aug. 12, 1998 under 35 U.S.C. §119.

BACKGROUND OF THE INVENTION

1. Field of the Invention

The present invention relates to an electrode material for an electrochemical capacitor, an electrochemical capacitor comprising an electrode containing such an electrode material, and a method for the production of such an electrode material.

2. Prior Art

Electric double layer capacitors utilize the capacitance of an electric double layer formed at an interface between a solid and a solution. In general, an electric double layer capacitor comprises a pair of polarizable electrodes (positive and negative electrodes), an electrolyte impregnated in the electrodes, a porous separator which contains an electrolyte impregnated therein, is ion-permeable and has electrical insulation properties so that it separates the electrodes to prevent the formation of a short circuit between them, and collectors connected to the respective electrodes. For example, in the case of a coin-type capacitor, a pair of electrodes, a separator interposed between the electrodes, and an electrolyte are stored in a metal case (can), and the case is sealed with a metal lid through an electrically insulating gasket to prevent the leakage of the electrolyte.

Such electric double layer capacitors have intermediate properties between the properties of cells and those of electrolytic capacitors, and have a large capacitance with a small volume. Thus, in these years, electric double layer capacitors attract attentions as the backup sources of small-sized electric devices, etc.

Electric double layer capacitors comprise polarizable electrodes as positive and negative electrodes, as described above. Hitherto, activated carbon having a large surface area is used as the material of such polarizable electrodes, since it has a large specific surface area and carries a large amount of electric charge on its surface, and thus the capacitance of electric double layer capacitors increases. In general, electrolytes comprise a medium having a high dielectric constant such as water or carbonates (e.g. propylene carbonate, etc.) to dissolve solutes in a high concentration.

However, the maximum specific surface area of activated carbon is practically about 3000 m$^2$/g. Thus, the capacitance per unit volume of electric double layer capacitors comprising electrodes containing activated carbon almost reaches its limit. Therefore, electrochemical capacitors are proposed, which comprise electrodes containing rutile-type ruthenium oxide, amorphous hydrated ruthenium oxide, or their hydrogenated products (e.g. $RuO_2 \cdot xH_2O$, etc.), which have a larger capacitance than activated carbon. However, electrochemical capacitors having electrodes containing such ruthenium oxides have a problem such that material costs are high since ruthenium is a rare material, although they have a ten to fifty times larger capacitance than those having electrodes containing activated carbon.

SUMMARY OF THE INVENTION

One object of the present invention is to provide a novel electrode material to be used to produce electrodes of electrochemical capacitors, which can provide capacitors at a low cost and achieve a high capacitance.

Another object of the present invention is to provide a method for the production of such an electrode material.

A further object of the present invention is to provide a low-cost electrochemical capacitor having a large capacitance using such an electrode material.

Accordingly, the present invention provides an electrode material for an electrochemical capacitor, comprising at least one titanium oxide compound selected from the group consisting of titanium oxide, hydrated titanium oxide and their hydrogenated products, and at least one oxidizable and reducible metal element contained in the titanium oxide compound.

Such an electrode material has a large capacity, for example, 300 coulombs per one cm$^3$ of the material.

Also, the present invention provides an electrochemical capacitor comprising a pair of electrodes at least one of which comprises an electrode material according to the present invention, a porous separator interposed between the pair of electrodes, and an electrolyte. Preferably, the electrodes, separator and electrolyte are enclosed in a case.

In addition, the present invention provides a method for the production of an electrode material for an electrochemical capacitor comprising the steps of:

dipping a substrate containing titanium in a solution of salt of at least one oxidizable and reducible metal, pulling out the substrate from the solution and drying it, and calcining the dried substrate.

Furthermore, the present invention provides a method for the production of an electrode material for an electrochemical capacitor comprising the steps of:

forming fine particles of an electrode material from at least one compound selected from the group consisting of salts, alkoxides and chelates of titanium, and at least one compound selected from the group consisting of salts, alkoxides and chelates of oxidizable and reducible metals, by an evaporation method, a co-precipitation method or a sol-gel method, and calcining said fine particles.

DETAILED DESCRIPTION OF THE INVENTION

Figure 1:
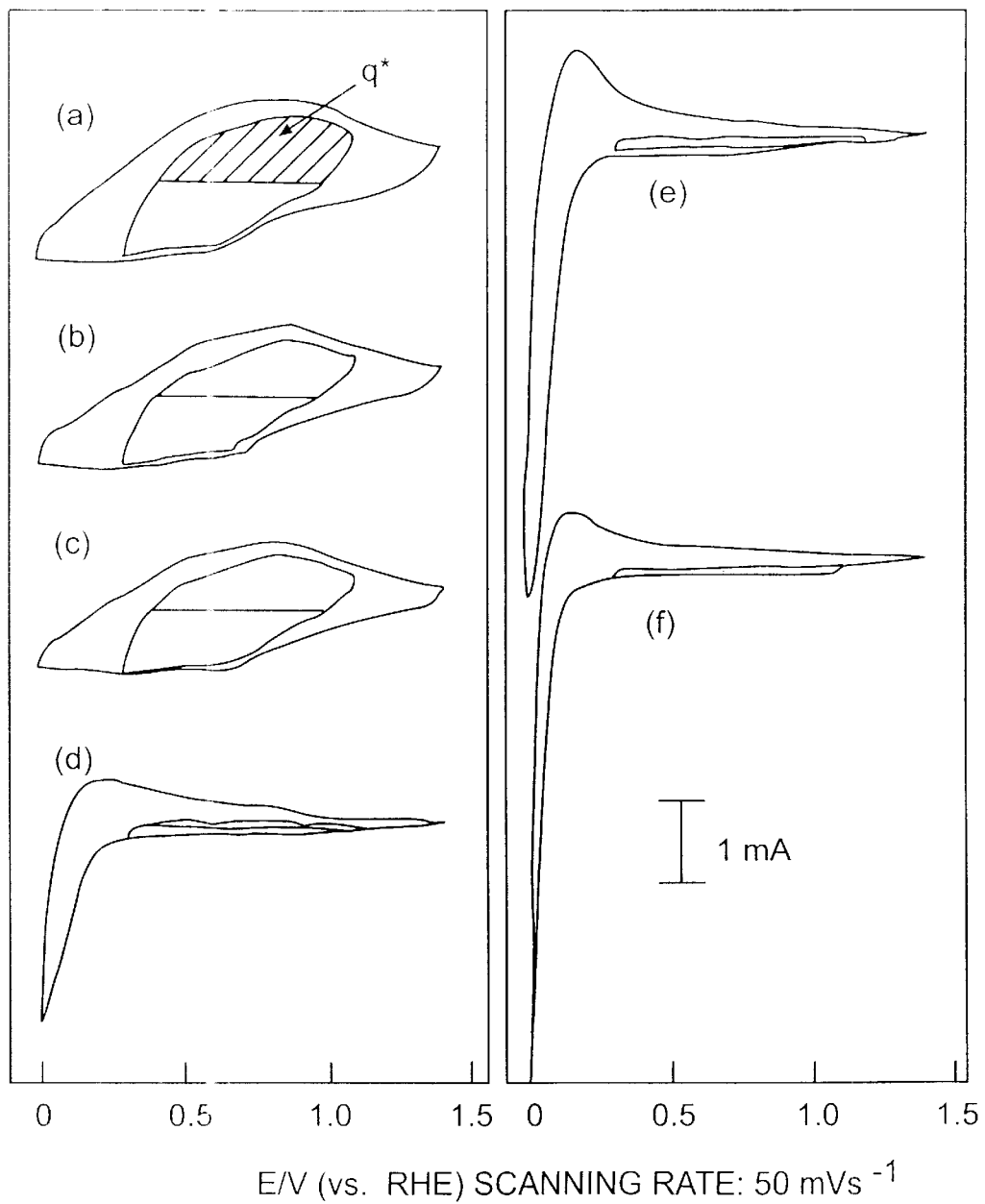
FIG. 1 shows cyclic voltammograms for the electrodes of Examples 1–3 and Comparative Examples 1–3.

The electrode material of the present invention is also characterized by that the X-ray diffraction pattern of the material indicates the presence of a component having a rutile structure as a main component. Thus, it is important for the electrode material of the present invention to contain, as a main component, a rutile-type titanium oxide compound, and at least one oxidizable and reducible metal element as an auxiliary component. However, the electrode material may optionally contain other auxiliary component (s). The possibility of the inclusion of other auxiliary component is supported by the undermentioned Examples, in which good results were attained when an electrode material contained tungsten in addition to vanadium.

When a rutile-type titanium oxide is finely powdered, it changes to an amorphous hydrated oxide. Such a hydrated titanium oxide can also be used in the present invention. Furthermore, when an electrode containing titanium oxide or hydrated titanium oxide is repeatedly charged and discharged, it is hydrogenated in an electrochemical capacitor. Such a hydrogenated oxide of titanium can also be used in the present invention.

Examples of an oxidizable and reducible metal element include vanadium (V), chromium (Cr), Manganese (Mn), iron (Fe), cobalt (Co), nickel (Ni), copper (Cu), etc. Vanadium can provide an electrode material having a large capacity.

The amount of an oxidizable and reducible metal element is in the range between 5 and 50 mole % based on the total mole of the titanium oxide compound and oxidizable and reducible metal element. When the amount of an oxidizable and reducible metal element is less than 5 mole %, the capacitance of an electrochemical capacitor cannot sufficiently increases. When the amount of an oxidizable and reducible metal element exceeds 50 mole %, it is difficult for oxidizable and reducible metal atoms to replace titanium atoms of the lattice of the titanium oxide compound. In addition, some problems may arise in the production process of capacitors when the amount of an oxidizable and reducible metal element exceeds 40 mole %, although the capacitance of a capacitor increases as the amount of an oxidizable and reducible metal element increases. Thus, the amount of an oxidizable and reducible metal element is in the range between 10 and 40 mole %

One preferred method for the production of an electrode material for an electrochemical capacitor comprises the steps of:
dipping a substrate containing titanium in the solution of a salt of at least one oxidizable and reducible metal dissolved in a solvent, for example, a mixed solvent of ethylene glycol and nitric acid,
pulling out the substrate from the solution and drying it, and
calcining the dried substrate at a temperature of at least 650° C., preferably from 650 to 800° C., more preferably from 650 to 750° C.

When a calcining temperature is less than 650° C., norutile-type titanium oxide forms. When a calcining temperature exceeds 800° C., the evaporated amount of an oxidizable and reducible metal such as vanadium may increase and be lost.

A substrate may be a titanium substrate such as a sponge titanium, etc. Furthermore, a pressed body or a coated body of the mixture of fine particles of the above electrode material and an electron conductive carbon powder may be used as an electrode.

The fine particles of an electrode material can be prepared by evaporating a solvent from the solution of salts, alkoxides or chelates of titanium, and salts, alkoxides or chelates of an oxidizable and reducible metal dissolved in a solvent, for example, a mixed solvent of ethylene glycol and nitric acid, and calcining the dried material. The fine particles of an electrode material can also be prepared by other wet method such as a co-precipitation method or a sol-gel method.

A calcining temperature maybe the same as in the above dipping method, while a calcining temperature in the sol-gel method is 100 to 200° C. lower than the above temperature.

In the course of the preparation of titanium oxide or hydrated titanium oxide containing an oxidizable and reducible metal element, the calcination is preferably carried out in an inert gas atmosphere or a reducing atmosphere to control the valence of the metal element, for example, to adjust the valence of the metal element to tetravalent so that the metal atoms can easily replace the titanium atoms of titanium oxide ($TiO_2$).

A preferred titanium salt is titanium sulfate, a preferred titanium alkoxide is tetraisopropoxy titanium, and a preferred titanium chelate is titanium (IV) acetylacetone chelate.

Preferred examples of the salts of oxidizable and reducible metals include ammonium salts, sulfates, chlorides, etc., preferred examples of the alkoxides of oxidizable and reducible metals include triisoporopoxyvanadyl and corresponding alkoxides of other metals, and preferred examples of the chelates of oxidizable and reducible metals include vanadium (IV) acetylacetone chelate and corresponding chelates of other metals.

A tungsten salt may be ammonium tungstate, tungsten chloride, etc., a tungsten alkoxide may be pentaisopropoxy tungsten, and a tungsten chelate may be tungsten (IV) acetylacetone chelate.

The electrochemical capacitor of the present invention comprises a pair of electrodes (positive and negative electrodes) at least one of which comprises an electrode material according to the present invention, a porous separator interposed between the pair of electrodes, and an electrolyte. In a preferred embodiment, the electrodes, separator and electrolyte are enclosed in a case (can).

In such a capacitor, the substrate of an electrode may comprise a titanium plate, titanium sponge or carbon, and a pressed body or a coated body of the mixture of fine particles of the above electrode material and an electron conductive carbon powder may be used as an electrode. In particular, a titanium sponge or a titanium plate is preferable.

Examples of a binder used to prepare a coating material containing the mixture of the fine particles of the above electrode material and an electron conductive carbon powder include polytetrafluoroethylene (PTFE), and water-soluble binder resins such as hydroxymethylcellulose, hydroxyethylcellulose, carboxycellulose, hydroxypropylcellulose, hydroxypropyl-methylcellulose, hydroxyethylmethylcellulose, polyvinyl-pyrrolidone, polyethylene glycol, carboxymethylcellulose, etc. They may be used singly or in admixture.

Examples of an electron conductive carbon include carbon black such as acetylene black; natural or synthetic graphite; ketjen black, etc. In addition, carbon fiber, metal powder, metal fiber, and the like may be used in combination with an electron conductive carbon to increase an electron conductivity.

An electrolyte may be an acidic or alkaline aqueous solution.

When an aqueous sulfuric acid solution is used as an electrolyte, a can in which electrodes and an electrolyte are stored has an inner wall made of titanium or tantalum, which is chemically stable against the aqueous sulfuric acid solution as an electrolyte. Furthermore, a can may be made of a metal material such as iron, nickel or stainless steel which is lined with a plastic layer.

When an alkaline aqueous solution is used as an electrolytic solution (for example, an aqueous KOH solution), a can may be made of nickel, iron the inner wall of which is plated or cladded with nickel, or stainless steel. In this case, a substrate may be any substrate, which is used in nickel-cadmium cells or MH cells such as a nickel foil, a nickel sponge, a punching nickel, etc. The pressed or coated body of the mixture of fine particles of an electrode material and a conductive carbon powder, etc. may be used as an electrode.

In the case of a coin-type electrochemical capacitor comprising a metal can as a case to contain electrodes, an electrolyte, etc., the inner wall material of a positive or negative electrode can constituting a case, which functions as a positive or negative electrode, may also function as the substrate for an electrode material.

According to the method for the production of an electrochemical capacitor according to the present invention, in which vanadium is used as an oxidizable and reducible metal element, a titanium substrate is dipped in a solution of a vanadium salt dissolved in a solvent, and pulled out from the solution. Then, the substrate is calcined at a temperature of at least 650° C. Thus, a fine-particle solid solution $(Ti_{1-x}V_xO_2)$ having a rutile structure may be formed on the surface of the titanium substrate.

An electrode material carrying, on its surface, such a fine-particle solid solution layer has an increased capacitance, probably because a solid solution may have a large specific surface area, as can be seen from the data obtained in the undermentioned Examples.

Titanium oxide to be used in the present invention is cheaper and more easily purchased than ruthenium oxide. Thus, the present invention can provide an electrode material for an electrochemical capacitor having a large capacity per unit volume at a low cost, and also an electrochemical capacitor comprising such an electrode material, which has a large capacitance at a low cost.

In the production of such an electrochemical capacitor, when the aqueous solution of sulfuric acid is used as an electrolytic solution, the corrosion of a can, which is used to assemble the capacitor, is prevented by the use of a titanium or tantalum material stable against the aqueous solution of sulfuric acid as an inner wall, or the use of a metal material (e.g. iron, nickel, stainless steel, etc.) which is lined with a plastic material. When an alkaline electrolyte such as an aqueous potassium hydroxide solution is used, a can material which is used in MH cells (e.g. nickel-plated iron, nickel, nickel-plated stainless steel, chromium-rich stainless steel, etc.) may be used.

EXAMPLES

The present invention will be illustrated by the following Examples, which do not limit the scope of the present invention.

PRODUCTION OF ELECTRODES

Examples 1–3 and Comparative Examples 1–3

1) A titanium substrate was dipped and etched in oxalic acid at 80° C. for 60 minutes to remove impurities from the surface of the substrate and clean the surface of the substrate.

A titanium substrate used in these Examples was a rod. It is preferable to use a titanium sponge as a substrate to further increase the capacity of a capacitor. A titanium sponge substrate has advantages such that it can carry thereon a large amount of an electrode material, and no binder is necessary to form the layer of an electrode material thereon.

2) Ethylene glycol and nitric acid were mixed in a volume ratio of 9:1 to obtain a mixed solvent.

Then, a tungsten compound of the formula: 5 $(NH_3)$ $0.12WO_3.5H_2O$ was dissolved in the mixed solvent, while a vanadium compound of the formula: $NH_4VO_3$) was dissolved in the mixed solvent. The two solutions were mixed so that a molar ratio of tungsten (W) to vanadium (V) was 5:5 (W:V) and the total concentration of tungsten and vanadium was 0.1 mole/liter, to obtain a coating liquid.

3) The pretreated titanium substrate was dipped in the coating liquid, and then pulled out from the liquid at a rate of 1 mm/sec. to apply the coating liquid on the surface of the substrate.

4) The coated substrate was dried at 60° C. for 10 minutes, and then heated at the following calcining temperature for 10 minutes, followed by cooling. The steps of coating, drying and calcining were repeated 10 times to obtain a sample electrode material.

Calcining temperature:
(a) Example 1: 750° C.
(b) Example 2: 700° C.
(c) Example 3: 650° C.
(d) Comparative Example 1: 600° C.
(e) Comparative Example 2: 550° C.
(f) Comparative Example 3: 450° C.

Example 4

A sample electrode material was produced in the same manner as in Examples 1–3 and Comparative Examples 1–3 except that no solution containing the tungsten compound was used in the preparation of a coating liquid, and the substrate was calcined at 650° C.

Comparative Example 4

A sample electrode material was produced in the same manner as in Examples 1–3 and Comparative Examples 1–3 except that no solution containing the vanadium compound was used in the preparation of a coating liquid, and the substrate was calcined at 650° C.

Examples 5–8

A sample electrode material was produced in the same manner as in Example 3 except that the molar ratio of tungsten to vanadium was changed as follows:
(l) W:V=10:0 (Comparative Example 4)
(m) W:V=9:1 (Example 5)
(n) W:V=7:3 (Example 6)
(c) W:V=5:5 (Example 3)
(p) W:V=3:7 (Example 7)

(q) W:V=1:9 (Example 8)

(i) W:V=0:10 (Example 4)

EVALUATION

The electrochemical properties of the electrode materials obtained in the above Examples and Comparative Examples were measured by a cyclic voltammetry, which is explained below.

Also, the conditions of compounds on the electrode material surfaces were checked by a X-ray diffraction pattern.

The results are shown in FIG. 1–7.

The cyclic voltammetry was carried out using a beaker type trielectrode type electrolytic cell. A counter electrode was a platinum mesh electrode, while a reference electrode was a Ag/AgCl electrode. An electrolytic solution was 0.5 M $H_2SO_4$. For the adjustment, distilled water, which had been passed through an ion-exchange resin, was used.

A potential was scanned with a potentiostat equipped with a function generator (HAB-151 manufactured by HOKUTO DENKO KABUSHIKIKAISHA), and recorded with a X-Y recorder (Type 3023 manufactured by YOKOKAWA ELECTRIC CORPORATION). The measurement was carried out at 25° C.

The coated layer was removed from the surface of the electrode material produced in each of Examples or Comparative Examples with leaving the coated layer in a surface area having a length of 2.0 cm from one end of the rod-form electrode material (an apparent surface area of 1.04 $cm^2$). This electrode material was used as a working electrode, and placed in the electrolytic cell with separating the electrode from the tip end of a Luggin capillary by about 2 mm.

The measurement was carried out while blowing a high purity nitrogen gas to deoxidize the solution, and removing dissolved oxygen. An electrode potential was expressed using a reversible hydrogen electrode (RHE) as a standard in all cases.

The capacity of an electrode was a value obtained by integrating an hatched area, which is surrounded by the horizontal line on which an current was zero and a loop above this horizontal line, in the potential range between 0.3 and 1.1 V in a cyclic volt ammogram. The effective thickness of an electrode, that is, the thickness of a layer, which was formed on the titanium substrate and actually functioned as an electrode, was about 0.1 μgm.

Figure 2:
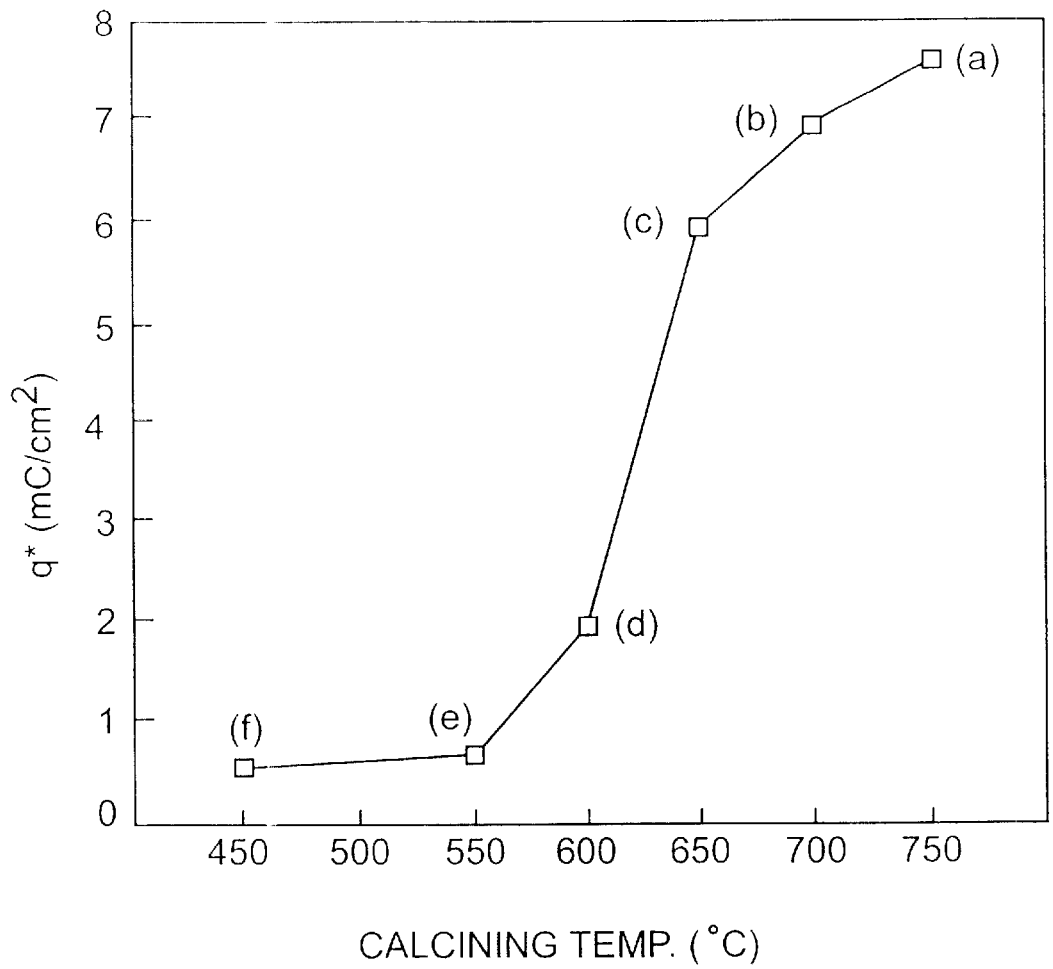
FIG. 2 shows relationships between a calcining temperature (° C.) and an electric charge per unit area (q*) [mC/cm$^2$] in Examples 1–3 and Comparative Examples 1–3.
Figure 3:
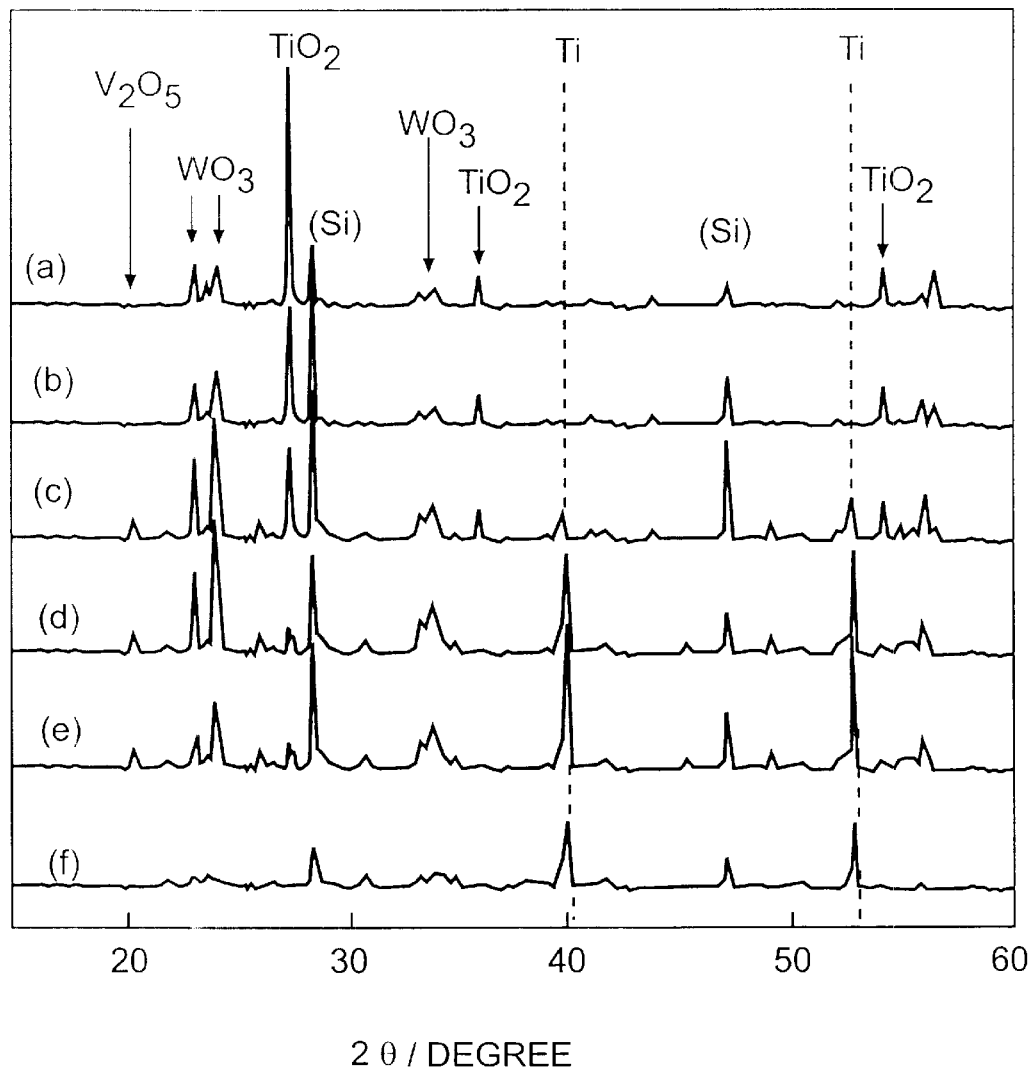
FIG. 3 shows X-ray diffraction patterns on the surfaces of the electrodes of Examples 1–3 and Comparative Examples 1–3.

FIGS. 1–3 show the results of Examples 1–3 and Comparative Examples 1–3, in which FIG. 1 shows cyclic voltammograms for the electrodes, FIG. 2 shows relationships between a calcining temperature (° C.) and an electric charge per unit area (q*) [$mC/cm^2$], and FIG. 3 shows X-ray diffraction patterns on the surfaces of the electrodes.

In FIG. 1, the abscissa and ordinate indicate an electrode voltage and a current, respectively.

The horizontal line drawn in the inner loop of (a) indicates the case in which the current was zero (0). The hatched area, which is surrounded by this horizontal line and the loop, corresponds to the amount of electric charge. In this case, an electrode, which gives a lip shape loop as a whole, has the large amount of electric charge, and is suitable as an electrode for an electrochemical capacitor. Thus, it can be seen from FIG. 1 that the electrodes giving the loops (a), (b) and (c), that is, the electrodes of Examples 1–3 had the large capacity.

In contrast with the electrodes of Examples 1–3, those of Comparative Examples 1–3 giving the loops of (d), (e) and (f), respectively had no inner loop or a flat inner loop, and thus had a small capacity.

In FIG. 2, the electric chargeq* (capacity) sharply increased at a temperature of 650° C. or higher, at which a titanium oxide having the rutile structure forms. These results suggest that a coating liquid containing vanadium and tungsten compounds is applied to a titanium substrate and then should be calcined at a temperature of 650° C. or higher as in the case of Examples 1–3 which gave the loops (a), (b) and (c), respectively.

In the above Examples, a titanium substrate carrying an applied coating liquid was calcined to form a rutile type titanium oxide. Alternatively, when fine particles of an electrode material are prepared by a wet method such as a co-precipitation method or a sol-gel method, they are preferably calcined in a reducing atmosphere or an inert-gas atmosphere.

FIG. 3 shows X-ray diffraction patters (intensity of diffracted X-ray vs. 2θ). In FIG. 3, peaks corresponding to a rutile type titanium oxide appeared at a calcining temperature of 650° C. (in the case of Example 3 indicated by (c)). The intensities of such peaks increased as the calcining temperature rose, while a peak corresponding to $V_2O_5$ had a slight intensity in the pattern (c), and disappeared in the pattern (a) corresponding to a calcining temperature of 750° C. Vanadium oxide, which gave a peak in the pattern (c), could be removed by washing with sulfuric acid.

Figure 4:
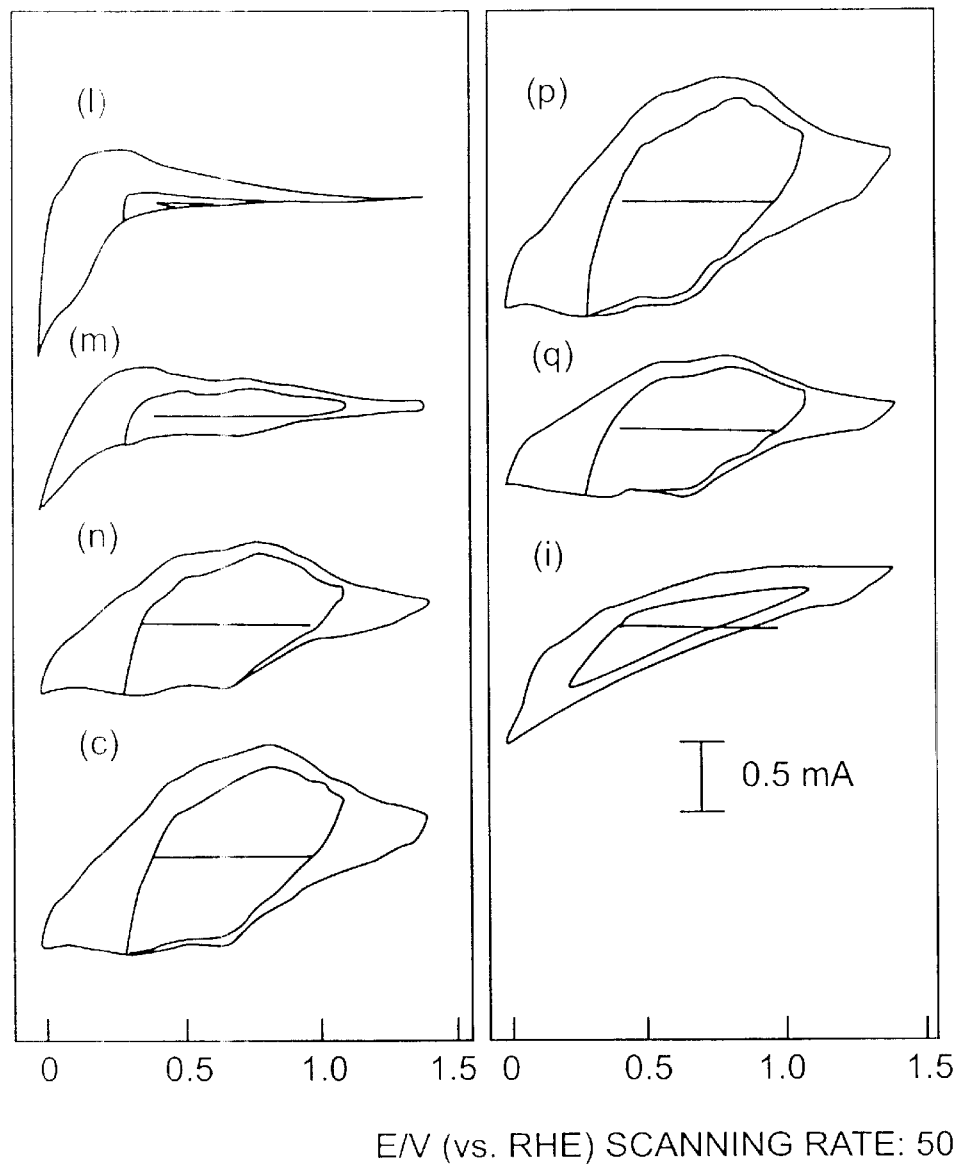
FIG. 4 shows cyclic voltammograms for the electrodes of Examples 3–8 and Comparative Example 4.
Figure 5:
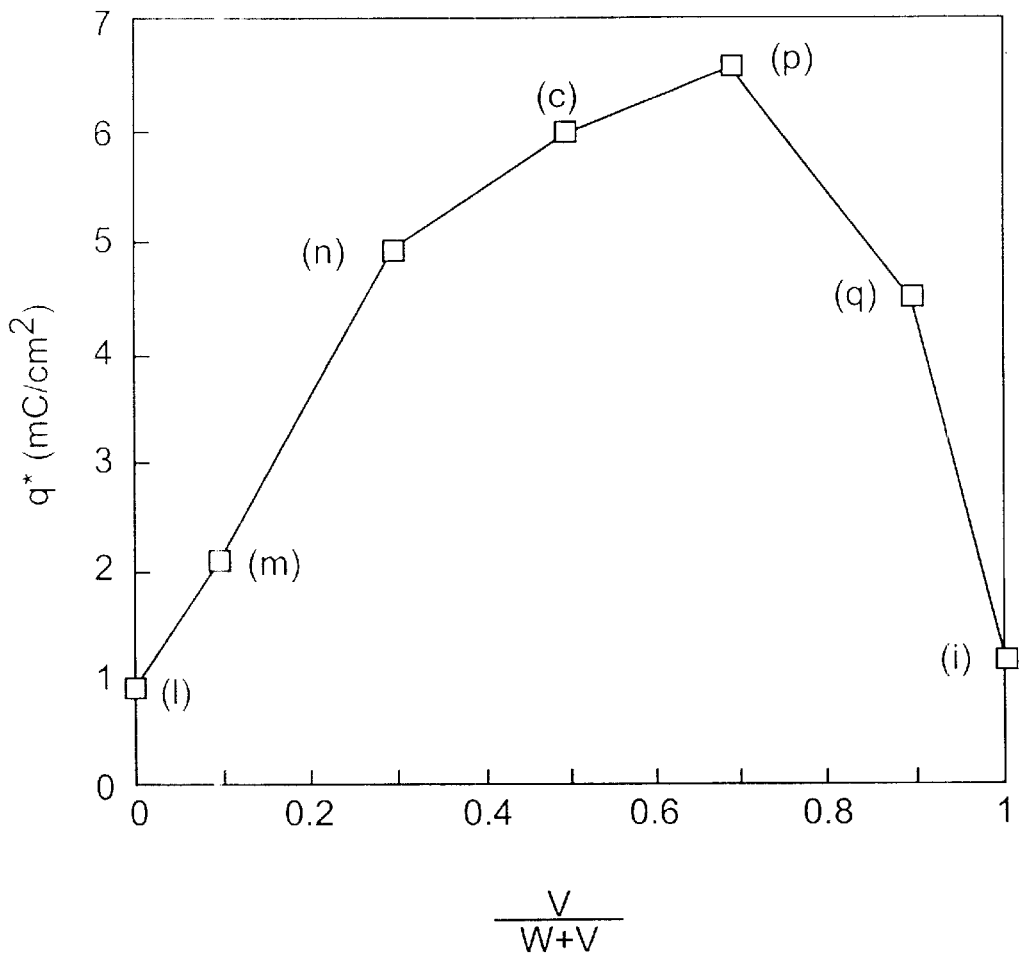
FIG. 5 shows relationships between a molar ratio of vanadium and tungsten and an electric charge per unit area (q*) [mC/cm$^2$] in Examples 3–8 and Comparative Example 4.
Figure 6:
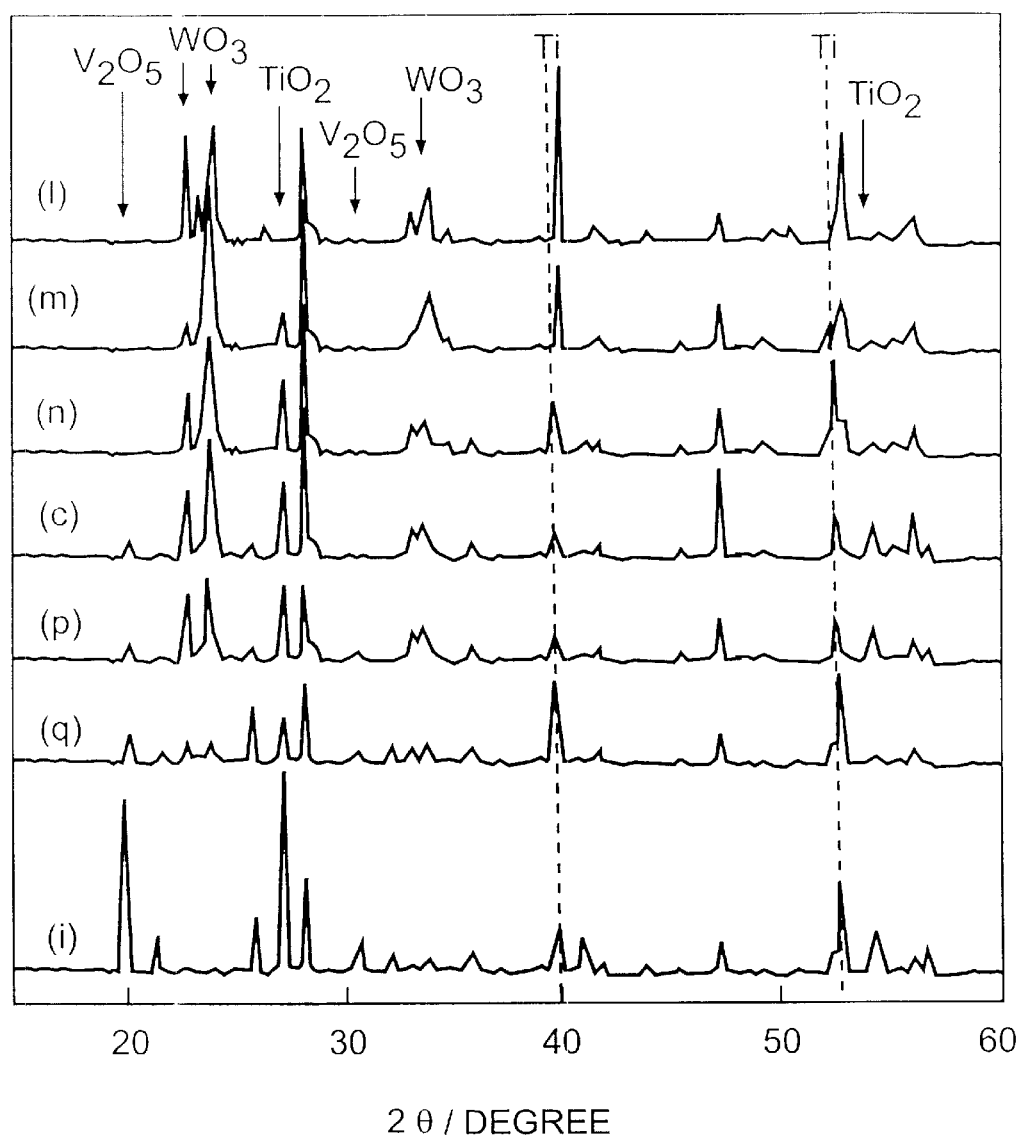
FIG. 6 shows X-ray diffraction patterns on the surfaces of the electrodes of Examples 3–8 and Comparative Example 4.

FIGS. 4–6 show the results of Examples 3–8 and Comarative Example 4, in which FIG. 4 shows cyclic voltammograms for the electrodes, FIG. 5 shows relationships between a molar ratio of vanadium and tungsten and an electric charge per unit area (q*) [$mC/cm^2$], and FIG. 6 shows x-ray diffraction patterns on the surfaces of the electrodes.

It can be seen from FIG. 4 that a lip-form inner loop appeared in the loop (m) which shows the result of Example 5 (W:V=9:1), and the electric charge was maximized in Example 3 (M:V=5:5) and Example 7 (M:V=3:7), the results of which are shown by the loops (c) and (p), respectively, while the electric charge was minimized when W:V was 10:0, that is, no vanadium was added as in Comparative Example 4 the result of which is shown by the loop (l). These results indicate that the molar ratio of tungsten to vanadium (W:V) is preferably from 3:7 to 5:5, when vanadium and tungsten are used in combination.

FIG. 5 shows a relationship between an electric charge per unit area (q*) and a molar ratio of vanadium to the sum of vanadium and tungsten (V/(W+V)). FIG. 5 also indicates that the electric charge was maximized in Example 3 (M:V=5:5) and Example 7 (M:V=3:7), the results of which are shown by the points (c) and (p).

In FIG. 6, no peak corresponding to $V_2O_5$ appears in the patterns (l), (m) and (n) of Comparative Example 4, Example 5 and Example 6, respectively, while a peak corresponding to $V_2O_5$ appears in the patterns (c), (p), (q) and (i) of Examples 3, 7, 8 and 4, respectively. The intensity of a peak corresponding to $TiO_2$ increases in the order of (l), (m), (n), (c), (p), (q) and (i) as a general tendency.

Figure 7:
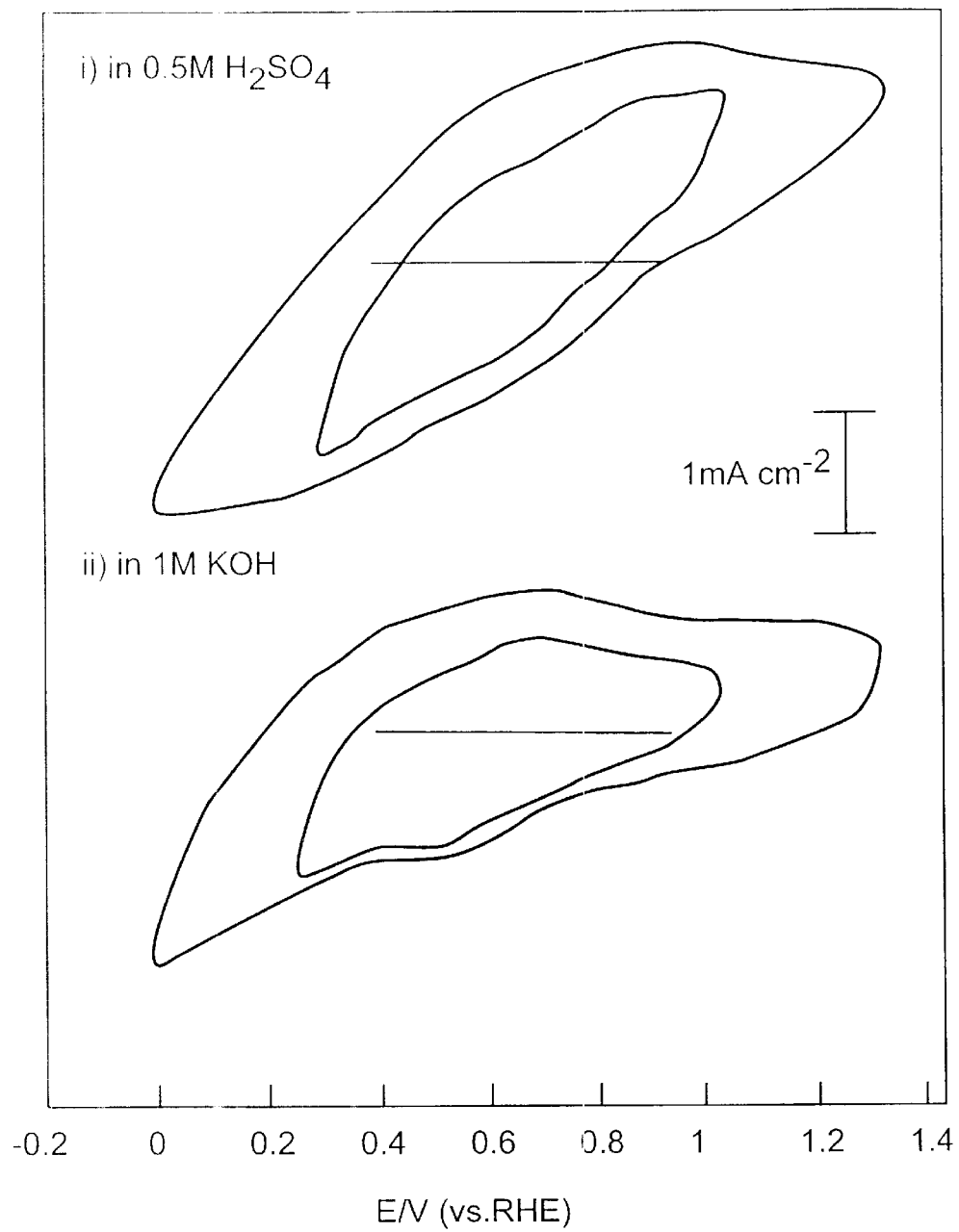
FIG. 7 shows cyclic voltammograms of electrodes comprising an aqueous solution of sulfuric acid or an aqueous solution of potassium hydroxide, as an electrolyte.

FIG. 7 shows the results of a capacity comprising a pair of titanium electrodes carrying $VO_X$ (70 mole %) and $WO_X$ (30 mole %) and a spacer made of cellulose, both of which were impregnated with an aqueous solution of sulfuric acid (0.5 M/l) or an aqueous solution of potassium hydroxide (1M/l) as an electrolytic solution. The results of FIG. 7 indicate that the both electrolyte provided capacitors having substantially the same capacity.

Now, one example of an electrochemical capacitor, to which the present invention is applied, will be explained by making reference to FIG. 8, which shows a cross-sectional view of such an electrochemical capacitor.

Figure 8:
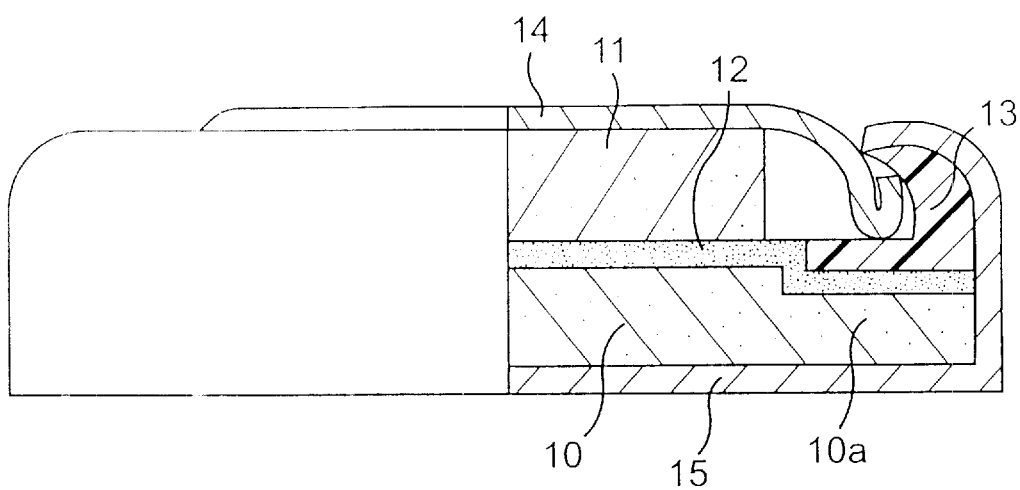
FIG. 8 shows a cross-sectional view of a typical electrochemical capacitor according to the present invention.

The capacitor of FIG. 8 has a pair of electrodes 10, 11, which are impregnated with an electrolyte, and a separator which is also impregnated with an electrolyte and placed between the pair of electrodes.

An separator is preferably made of cellulose, polypropylene, polyethylene, and the like.

An annular gasket 13 is provided on a peripheral part 10a of the positive electrode 10 with inserting the separator 12 between them. The inner circumference of the annular gasket 13 is mated with the turn-back portion of a metal cap 14. The annular gasket 13 is pressed against the peripheral part 10a of the positive electrode 10 through the cap 14, the inner circumference of the opening edge of a can 15 and the separator 12, by inwardly pinching the opening edge of the can 15, which is used as an exterior case. Thus, the opening of the can 15 is sealed.

The use of the electrode material of the present invention in the production of electrodes which are used to assemble an electrochemical capacitor can achieve the large capacity of the capacitor at a low cost.

A coating liquid containing vanadium and tungsten compounds was applied to a titanium substrate in the above Examples, although it is possible to produce an electrode, which can provide an electrochemical capacitor having a large capacity, by coating a titanium complex and a tungsten complex on a titanium substrate, calcining the coated substrate, then applying a vanadium complex, and again calcining the coated substrate. Furthermore, it is possible to produce an electrode having a large capacity by the use of a mixed coating liquid containing a titanium complex, a tungsten complex and a vanadium complex in place of a coating liquid which is used in Example 1.

What is claimed is:

1. A method for the production of an electrode material for an electromechanical capacitor comprising the steps of:

forming fine particles of an electrode material from at least one compound selected from the group consisting of salts, alkoxides and chelates of titanium, and at least one compound selected from the group consisting of salts, alkoxides and chelates of oxidizable and reducible metals, by a wet method, and calcining said fine particles at a temperature of at least 650° C.

2. The method of claim 1, wherein the wet method is an evaporation method.

3. The method of claim 1, wherein the wet method is a co-precipitation method.

4. The method of claim 1, wherein the calcining temperature is between 650° C. and 800° C.

5. The method of claim 1, wherein said salts are selected from the group consisting of ammonium salts, sulfates and chlorides.

6. The method of claim 1, wherein said alkoxid of oxidizable and reducible metals is triisoporopoxyvanadyl.

7. The method of claim 1, wherein said chelate is of vanadium (IV) acetylacetone chelate.

* * * * *